Patented July 7, 1925.

1,544,800

UNITED STATES PATENT OFFICE.

FRED W. BROWN, OF ALTON, AND GIDEON L. AUSTIN, OF JOLIET, ILLINOIS.

SEPARATION OF MAGNESIA FROM DOLOMITE.

No Drawing.   Application filed May 16, 1921. Serial No. 470,064.

*To all whom it may concern:*

Be it known that we, FRED W. BROWN and GIDEON L. AUSTIN, citizens of the United States, residing at Alton, in the county of Madison and State of Illinois, and Joliet, in the county of Will and State of Illinois, have invented certain new and useful Improvements in Separation of Magnesia from Dolomite, of which the following is a specification.

This invention relates to methods of obtaining magnesia and magnesium compounds from dolomite, and it comprises the process wherein dolomite, preferably in a ground condition, alone or in admixture with clay or clayey materials, is calcined and the calcined material then mixed with a solution of calcium chlorid, the solution being then treated with a mineral acid capable of forming an insoluble calcium salt, and the insoluble salt and clayey material being separated from the solution of magnesium salt by precipitation or other suitable means.

In the present invention, we have provided a method of recovering the magnesium content of dolomite or dolomitic materials and producing as a by-product, a calcium salt mixed with clayey material which may be employed in the manufacture of Portland cement. The dolomite is first mixed with the proper amount of clay when necessary or desirable, the proportion of clay employed depending upon the composition of the dolomite and the amount of silica or silica bearing materials present in the raw dolomite. The dolomite rock, either before or after admixture with clayey material, is calcined, preferably in the form of a fine powder at a temperature of from 1200 to 1800° F., until substantially all the carbonic acid is expelled. While we prefer to expel substantially all of the carbonic acid gas, this is not essential to the process and the invention is in no sense limited to this detail. After calcination, the powder is mixed with a water solution of a known weight of a calcium chlorid. We prefer to employ calcium chlorid in sufficient quantity to furnish enough chlorine to combine with the magnesia of the dolomite mixture in substantially the ratio of 71 parts of chlorine to 40 parts of magnesia, by weight. During the addition of the calcium chlorid, the material may be agitated. The material is then treated with a mineral acid capable of forming an insoluble calcium salt, this treatment being continued until a permanent acid reaction is shown in the solution. A small quantity of calcined dolomite is then added to bring the solution back to slightly alkaline reaction. Instead of adding the acid until an acid reaction is obtained, the addition of the acid may be governed to stop just short of the neutral point or slightly in excess thereof.

After the calcium has been converted to an insoluble salt by the acid, the precipitated pulp or slurry is removed from the solution in any convenient manner, the pulp consisting of precipitated salt and residual clay. This material may be used in the manufacture of Portland cement in the ordinary manner and forms an important by-product of the process. In the manufacture of Portland cement, the acid gases are driven off by calcining, and these gases may be absorbed and recovered by suitable absorption devices and the acids thus recovered, utilized in the repetition of the process.

The magnesium salt solution may be concentrated and purified for market or employed in the further recovery of magnesia from the calcined dolomite. In employing the magnesium salt to recover additional magnesia in the calcined dolomite, the concentrated salt and dolomite are mixed with sufficient water to produce a sludge. This mixture in a heated condition is passed through pulverizing mills to insure more thorough solution of the lime present in the dolomite and separation of the magnesia. Where less purer grades of magnesia are desired, the grinding, however, is not essential. The resultant magnesia pulp is washed, drained, filtered, or treated in any other manner to remove the solution. The calcium salt obtained and the magnesia may be then dried, calcined or otherwise refined for market.

In a typical embodiment of the invention, the dolomitic rock is preferably reduced to a fine powder and mixed with clay or clayey material before or after calcination. The amount of clay added will vary within wide limits and will depend upon the original composition of the dolomite. Where a large quantity of silica or silica bearing materials is present in the raw dolomite, a relatively small proportion of clay is added, but when a smaller proportion of silica is present, sufficient clay is added to furnish the necessary amount of silica in the manufacture of Portland cement from the mixture of calcium salt and clay obtained as a by-product. The dolomite rock alone or in admixture with clay, is calcined in any suitable apparatus at a temperature of from 1200 to 1800° F., until substantially all the carbonic acid gas is expelled. As stated, the expulsion of all the carbonic acid gas is not essential and the process is in no way limited to this detail. The calcined powder is then placed in suitable mixing and proportioning tanks containing a water solution of calcium chlorid. When calcium chlorid is used, the magnesia content of the calcined dolomite is first determined and sufficient calcium chlorid is added to permit the magnesia to combine with the chlorine in substantially the proportions of 71 parts of chlorine to 40 parts of magnesia by weight.

In order that the magnesia may be converted to magnesium chlorid, or other soluble magnesium salt, the mixture is then treated with a solution of a mineral acid capable of forming an insoluble calcium salt. For commercial reasons, we prefer to employ sulfuric acid, which is gradually added with continued agitation until a permanent acid reaction is shown in the solution, and all the lime converted to calcium sulfate. The solution is then brought back to slightly alkaline reaction by the addition of a small amount of the calcined dolomite. However the sulfuric acid may be added by weight and just sufficient acid added to convert all the calcium present to calcium sulfate. When the process is performed in this manner, the addition of acid is stopped just short of the neutral point, at the neutral point, or slightly in excess thereof.

The precipitated slurry or pulp thus formed is filtered, washed or treated in any other suitable manner to remove the chlorid of magnesium solution from the precipitated calcium sulfate and clay. The mixture of calcium sulfate and clay may then be employed in the manufacture of Portland cement. The slurry is calcined as in the ordinary manufacture of Portland cement and the sulfuric or sulfurous acid gases driven off are absorbed and recovered by suitable absorption apparatus. The recovered acid may be utilized in the repetition of the process.

The magnesium chlorid solution is preferably concentrated and purified in any suitable manner for market, or it may be employed in the further recovery of magnesia from the calcined dolomite. In the recovery of further magnesia, the magnesium chlorid and dolomite are mixed in proper proportions and sufficient water added to form a sludge. The mixture, preferably in a heated condition, is passed through pulverizing mills to insure thorough mixture, whereby the magnesia present in the magnesium chlorid is replaced by lime and the magnesia obtained, together with the magnesia originally present in the lime, separated from the lime solution. Where less purer grades of magnesia are desired, simple mixing may be employed in place of the treatment in a pulverizing mill.

The resultant magnesia pulp is washed, filtered, or treated in any other suitable manner to remove the solution of calcium chlorid. The pulp may then be dried and calcined, or treated in any other manner to refine it for market.

Where a purer grade of magnesia is desired, it is preferable to employ a calcined dolomite of a high degree of purity and to expel all volatile acids from the pulp by ignition at a high temperature.

While we have described in detail the preferred practice of our process, it is to be understood that the details of procedure, and proportion of ingredients may be widely varied and that known chemical equivalents may be employed in place of the materials mentioned, without departing from the spirit of the invention or the scope of the subjoined claims.

Having thus described our invention, we claim:

1. The process of separating magnesia from dolomite which comprises calcining dolomite, adding calcium chloride, treating the mixture with sulfuric acid to form calcium sulfate and magnesium sulfate which will react with the calcium chlorid present to form magnesium chlorid and additional calcium sulfate, and separating the precipitated calcium sulfate from the solution.

2. The process of separating magnesia from dolomite which comprises calcining dolomite, adding calcium chloride, treating the mixture with sulfuric acid to form calcium sulfate and magnesium sulfate which will react with the calcium chlorid present to form magnesium chlorid and additional calcium sulfate, and concentrating the solution to recover the magnesium chlorid.

3. The process of separating magnesia from dolomite which comprises calcining dolomite, adding a solution of calcium chlorid thereto, treating the mixture with sulfuric acid to form magnesium sulfate and calcium sulfate which will react with the calcium chlorid present to form magnesium chlorid, and separating the calcium sulfate from the magnesium chlorid solution.

In testimony whereof we affix our signatures in presence of two witnesses.

FRED W. BROWN.
GIDEON L. AUSTIN.

Witnesses as to the signature of Fred W. Brown:
H. C. ALEXANDER,
J. I. LEE.

Witnesses as to the signature of Gideon L. Austin:
GEORGE E. BARRETT,
ETHEL L. ZENTMEYER.